(12) United States Patent
Onuma

(10) Patent No.: US 12,238,266 B2
(45) Date of Patent: Feb. 25, 2025

(54) GENERATION APPARATUS, GENERATION METHOD, AND STORAGE MEDIUM

(71) Applicant: CANON KABUSHIKI KAISHA, Tokyo (JP)

(72) Inventor: Kazufumi Onuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/504,031

(22) Filed: Oct. 18, 2021

(65) Prior Publication Data

US 2022/0124302 A1    Apr. 21, 2022

(30) Foreign Application Priority Data

Oct. 20, 2020   (JP) ................................. 2020-175734

(51) Int. Cl.
- *H04N 13/282* (2018.01)
- *H04N 13/243* (2018.01)
- *H04N 13/275* (2018.01)

(52) U.S. Cl.
CPC ......... *H04N 13/282* (2018.05); *H04N 13/243* (2018.05); *H04N 13/275* (2018.05)

(58) Field of Classification Search
CPC .. H04N 13/282; H04N 13/275; H04N 13/279; H04N 13/243; G06T 15/20;
(Continued)

(56) References Cited

U.S. PATENT DOCUMENTS 10,885,701 B1 * 1/2021 Patel ................ A63F 13/57
2014/0375639 A1 * 12/2014 Kwon ................ G06T 15/60
345/426

(Continued)

FOREIGN PATENT DOCUMENTS

| JP | H09319891 A | 12/1997 |
|----|-------------|---------|
| JP | 2017211828 A | 11/2017 |
| JP | 2017212592 A | 11/2017 |

OTHER PUBLICATIONS

Jun Chen, et al., A Fast Free-viewpoint Video Synthesis Algorithm for Sports Scenes, 2019 IEEE/RSJ International Conference on Intelligent Robots and Systems (IROS), Macau, CN, Nov. 4-8, 2019, XP33695155.

(Continued)

*Primary Examiner* — Jayanti K Patel
*Assistant Examiner* — Christopher Kingsbury Glover
(74) *Attorney, Agent, or Firm* — Canon U.S.A., Inc. IP Division

(57) ABSTRACT

A generation apparatus includes following units. A first acquisition unit acquires a first virtual viewpoint image generated based on a plurality of images captured by a plurality of image capturing apparatuses, and a first virtual viewpoint in a three-dimensional space including an image capturing space captured by the plurality of image capturing apparatuses. A second acquisition unit acquires a second virtual viewpoint image generated based on the plurality of captured images, and a second virtual viewpoint arranged with respect to a predetermined surface in the three-dimensional space and the first virtual viewpoint. A generation unit generates a third virtual viewpoint image corresponding to the first virtual viewpoint and including an image indicating a state where an object in the image capturing space is reflected on the predetermined surface, based on the first virtual viewpoint image, and the second virtual viewpoint image.

19 Claims, 8 Drawing Sheets

(58) Field of Classification Search
CPC ....... G06T 15/205; G06T 15/60; G06T 7/194; G06T 7/11; G06T 7/10
See application file for complete search history.

(56) References Cited

U.S. PATENT DOCUMENTS

| | | | | |
|---|---|---|---|---|
| 2018/0359457 A1* | 12/2018 | Morisawa | ............ | H04N 13/128 |
| 2019/0082160 A1* | 3/2019 | Yano | ..................... | G06T 15/205 |
| 2019/0098278 A1* | 3/2019 | Koizumi | ................. | H04N 23/80 |
| 2021/0107511 A1* | 4/2021 | Matsunaga | ............ | B60W 30/06 |
| 2021/0134049 A1* | 5/2021 | Sugano | ................. | G06T 15/205 |

OTHER PUBLICATIONS

Web, How do reflections work for large flat surfaces?, GameDevelopment StackExchange, https://gamedev.stackexchange.com/questions/84440/how-do-reflections-work-for-large-flat-surfaces, accessed Feb. 23, 2022, XP55897460.

Web, Khayyam, Reflective water with GLSL, Part 1, Experimentation with 3D Posing and Animation, Sep. 16, 2011, http://khayyam.kaplinski.com/2011/09/reflective-water-with-glsl-part-i.html, XP55894888.

* cited by examiner

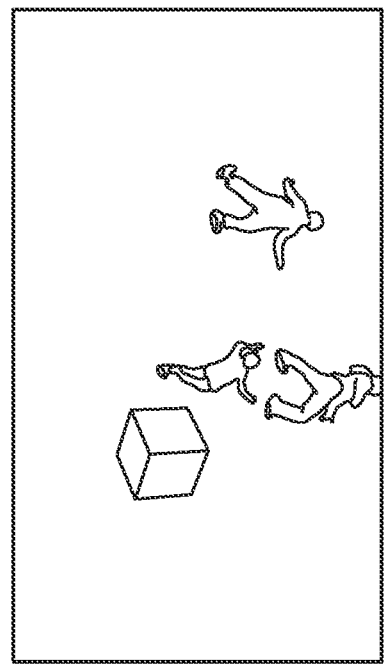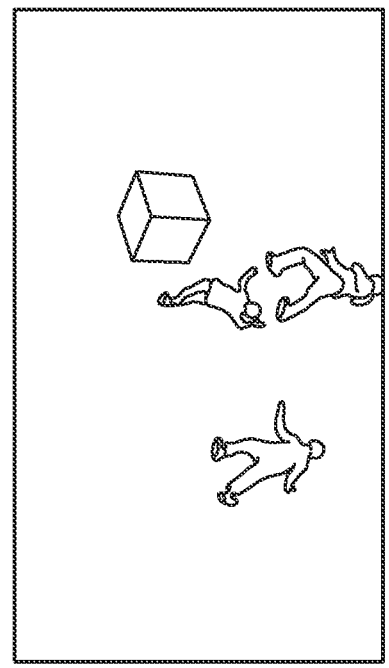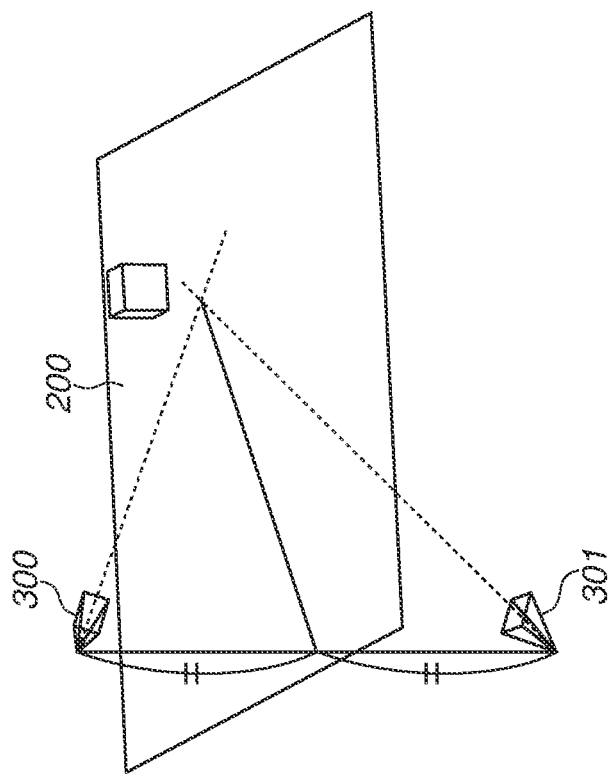

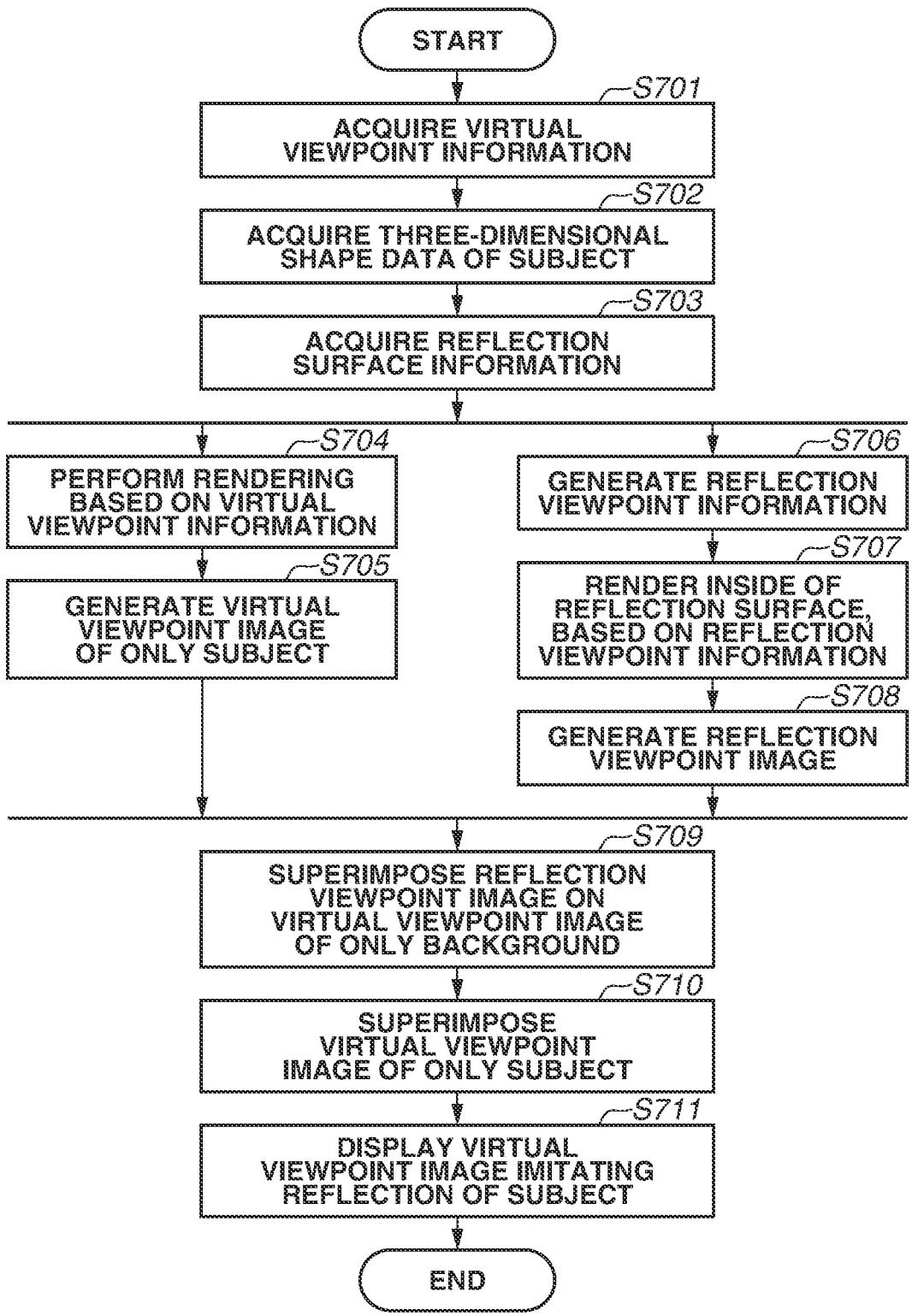

GENERATION APPARATUS, GENERATION METHOD, AND STORAGE MEDIUM

BACKGROUND

Field

The present disclosure relates to a technique for generating a virtual viewpoint image.

Description of the Related Art

Attention has been drawn to a technique in which a plurality of images is captured by a plurality of image capturing apparatuses disposed around an image capturing area, and an image (a virtual viewpoint image) viewed from a designated viewpoint (a virtual viewpoint) is generated using the plurality of captured images acquired from the respective image capturing apparatuses.

Japanese Patent Application Laid-Open No. 2017-211828 discusses a method of generating a virtual viewpoint image by combining an image of a subject generated by using three-dimensional shape data representing the subject and an image of a background.

Depending on the background expressed in a virtual viewpoint image, it is desired to give the background reality by expressing a state where a subject is reflected on a floor surface or a wall surface serving as the background in the virtual viewpoint image. However, this is not considered in Japanese Patent Application Laid-Open No. 2017-211828.

SUMMARY

According to an aspect of the present disclosure, a generation apparatus includes a first acquisition unit, a second acquisition unit, and a generation unit. The first acquisition unit is configured to acquire a first virtual viewpoint image generated based on a plurality of images captured by a plurality of image capturing apparatuses, and a first virtual viewpoint in a three-dimensional space including an image capturing space captured by the plurality of image capturing apparatuses. The second acquisition unit is configured to acquire a second virtual viewpoint image generated based on the plurality of captured images, and a second virtual viewpoint arranged with respect to a predetermined surface in the three-dimensional space and the first virtual viewpoint. The generation unit is configured to generate a third virtual viewpoint image corresponding to the first virtual viewpoint and including an image indicating a state where an object in the image capturing space is reflected on the predetermined surface, based on the first virtual viewpoint image acquired by the first acquisition unit, and the second virtual viewpoint image acquired by the second acquisition unit.

Further features of the present disclosure will become apparent from the following description of exemplary embodiments with reference to the attached drawings.

BRIEF DESCRIPTION OF THE DRAWINGS

FIG. 4A is a diagram illustrating an example of each of a virtual viewpoint and a reflection viewpoint. FIGS. 4B and 4C are diagrams illustrating an example of a reflection viewpoint image corresponding to the reflection viewpoint.

FIG. 7 is a flowchart illustrating processing performed by the generation system according to the second exemplary embodiment.

DESCRIPTION OF THE EMBODIMENTS

Exemplary embodiments of the present disclosure will be described below with reference to the drawings. Components to be described in the following exemplary embodiments each represent an example of an embodiment of the present disclosure and are not intended to limit the present disclosure.

A first exemplary embodiment describes a generation apparatus that generates a virtual viewpoint image imitating a state where a subject is reflected and appears in a background. The virtual viewpoint image in the present exemplary embodiment is also called a free viewpoint image, but is not limited to an image corresponding to a viewpoint (a virtual viewpoint) designated freely (arbitrarily) by a user. An image corresponding to a viewpoint selected by a user from a plurality of candidates is also included in examples of the virtual viewpoint image. In the present exemplary embodiment, a case where the virtual viewpoint is designated by a user operation will be mainly described. However, the virtual viewpoint may be automatically designated based on, for example, a result of image analysis. In the present exemplary embodiment, a case where the virtual viewpoint image is a moving image will be mainly described, but the virtual viewpoint image may be a still image.

Figure 1:
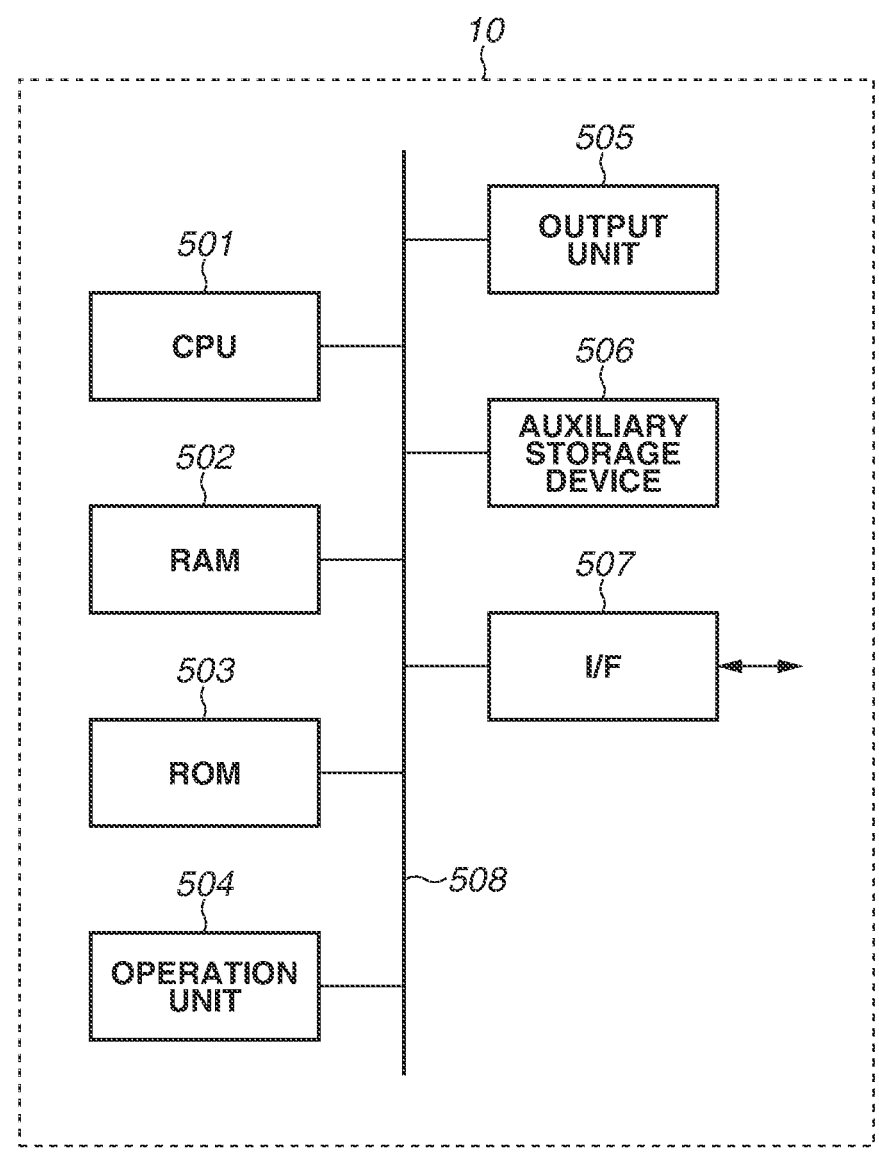
FIG. 1 is a block diagram illustrating a hardware configuration of a generation apparatus.

FIG. 1 is a diagram illustrating a hardware configuration of a generation apparatus 10 according to the present exemplary embodiment. The generation apparatus 10 includes a central processing unit (CPU) 501, a random access memory (RAM) 502, a read only memory (ROM) 503, an operation unit 504, an output unit 505, an auxiliary storage device 506, an interface (I/F) 507, and a bus 508.

The CPU 501 controls the entire generation apparatus 10, using a computer program and data stored in the RAM 502 or the ROM 503. In other words, the CPU 501 functions as each processing unit in the generation apparatus 10.

The RAM 502 temporarily stores a computer program and data read out from the auxiliary storage device 506, and data acquired from outside via the I/F 507. The RAM 502 also has a work area to be used when the CPU 501 executes various kinds of processing. In other words, the RAM 502 can be allocated as, for example, a frame memory, and provide other various areas as appropriate.

The ROM 503 stores data about settings of the generation apparatus 10, and a boot program. The operation unit 504 includes a keyboard, a mouse, and a joystick. A user of the generation apparatus 10 can input various instructions for the CPU 501 by operating the operation unit 504. The output unit 505 includes a liquid crystal display, and displays a result of processing performed by the CPU 501.

The auxiliary storage device 506 is an information storage device represented by a hard disk drive device. The auxiliary storage device 506 stores, for example, an operating system (OS), and a computer program for the CPU 501 to implement a function of each processing unit of the generation apparatus 10. Based on the control by the CPU 501, the computer program and data stored in the auxiliary storage device 506 are loaded into the RAM 502 as appropriate to be processed by the CPU 501. The auxiliary storage device 506 also stores image data to be processed by the generation apparatus 10.

The I/F 507 is connected to a network, such as a local area network (LAN) or the Internet, and to other apparatuses, such as a projection apparatus and a display apparatus, and transmits and receives information. For example, in a case where the generation apparatus 10 is connected to an external apparatus by wire, a cable for communication is connected to the I/F 507. In a case where the generation apparatus 10 has a function of wirelessly communicating with an external apparatus, the I/F 507 includes an antenna. The bus 508 connects the units described above and transmits information.

In the configuration illustrated in FIG. 1, the operation unit 504, the output unit 505, and the auxiliary storage device 506 are included inside of the generation apparatus 10, but are not limited to this configuration. For example, at least one of the operation unit 504, the output unit 505, and the auxiliary storage device 506 may be externally connected to the generation apparatus 10 as other apparatus.

Figure 2:
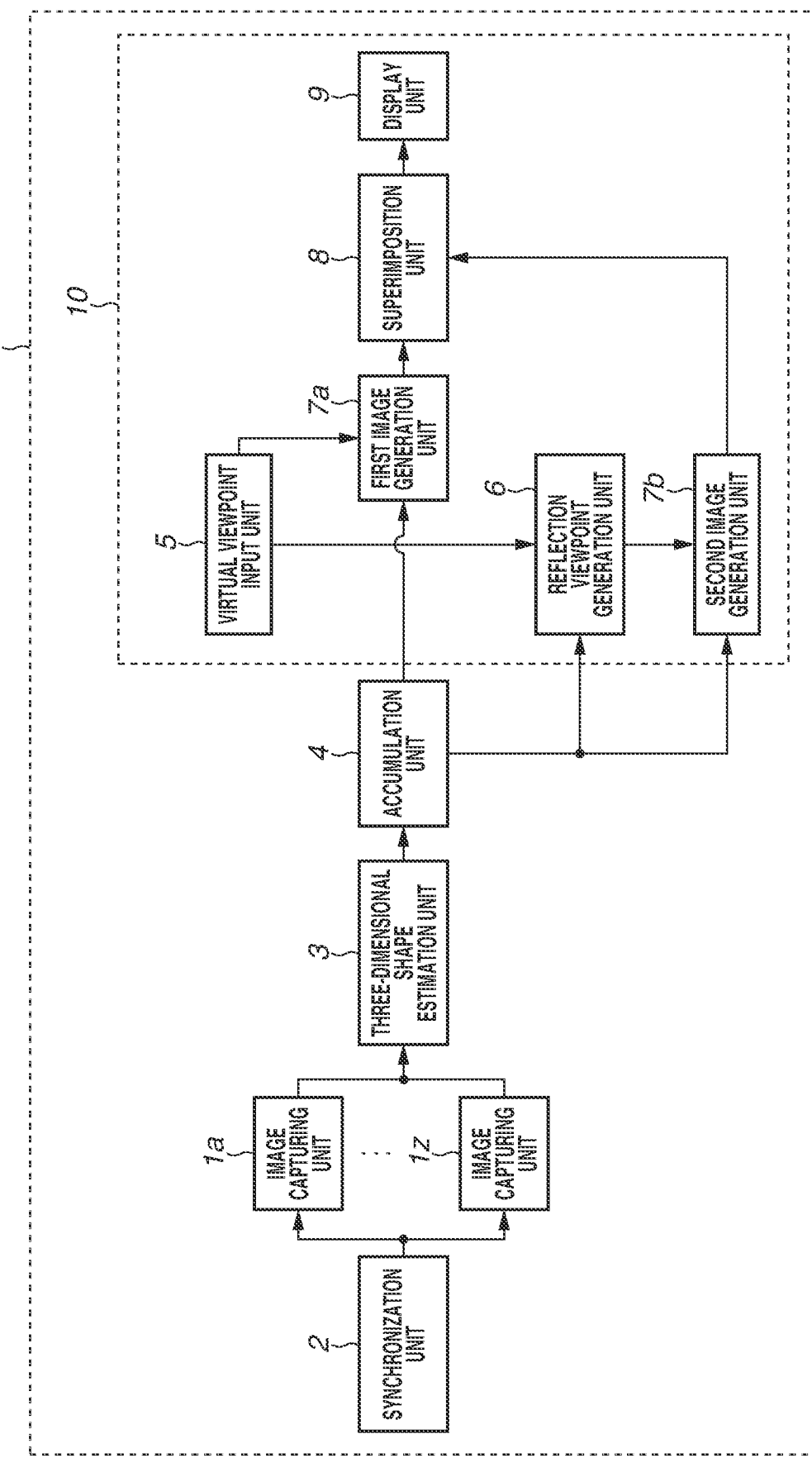
FIG. 2 is a block diagram illustrating a configuration of a generation system according to a first exemplary embodiment.

FIG. 2 is a diagram illustrating a configuration of the generation system that generates the virtual viewpoint image in the present exemplary embodiment. A generation system 20 illustrated in FIG. 2 includes a plurality of image capturing units 1a to 1z, a synchronization unit 2, a three-dimensional shape estimation unit 3, an accumulation unit 4, and the generation apparatus 10. Among reference characters in FIG. 2, reference characters having the same number followed by different letters indicate devices having the same function. For example, the image capturing unit 1a and the image capturing unit 1z represent separate instances having the same function. Having the same function refers to having at least a specific function (i.e., an image capturing function), and, for example, the image capturing unit 1a and the image capturing unit 1z may partially vary in function and performance. In the following description, "image capturing units 1" represent a collective name for the image capturing units 1a to 1z. The number of the image capturing units 1 may be freely changed.

A plurality of image capturing units 1 is, for example, image capturing apparatuses such as cameras. The plurality of image capturing units 1 is installed to surround a subject, and captures the subject from a plurality of directions. The subject captured by the plurality of image capturing units 1 according to the present exemplary embodiment is an object for which three-dimensional shape data is generated by the three-dimensional shape estimation unit 3 to be described below. The subject can be a human or an object used by a human. The plurality of image capturing units 1 outputs the captured images to the three-dimensional shape estimation unit 3. The synchronization unit 2 generates a synchronization signal and transmits the generated synchronization signal to the plurality of image capturing units 1. The plurality of image capturing units 1 performs image-capturing in synchronization with each other, based on the synchronization signal received from the synchronization unit 2.

The three-dimensional shape estimation unit 3 generates the three-dimensional shape data representing the three-dimensional shape of the subject, using the input plurality of captured images. The three-dimensional shape estimation unit 3 according to the present exemplary embodiment generates a silhouette image obtained by extracting the area of the subject in each of the captured images. The three-dimensional shape estimation unit 3 may also generate the three-dimensional shape data of the subject by a method based on a conventional technique of a shape-from-silhouette method, using the plurality of silhouette images. The method of estimating the three-dimensional shape is not limited to this method, and other techniques may be used. The generated three-dimensional shape data of the subject includes information representing the position of the subject in an image capturing space, and information representing the three-dimensional shape of the subject. The silhouette image may be generated by a device different from the three-dimensional shape estimation unit 3. The three-dimensional shape estimation unit 3 outputs the generated three-dimensional shape data of the subject and the plurality of captured images acquired from the plurality of image capturing units 1 to the accumulation unit 4.

The accumulation unit 4 accumulates the plurality of captured images and the three-dimensional shape data output from the three-dimensional shape estimation unit 3. The accumulation unit 4 also accumulates three-dimensional shape data of an object (hereinafter referred to as a background) different from the subject represented by the three-dimensional shape data. Examples of the background described here can include a wall and a floor. The three-dimensional shape data of the background according to the present exemplary embodiment can be expressed by a polygon mesh, and has information about coordinates in a three-dimensional space. The three-dimensional shape data of the background is generated by the following method. For example, as with the three-dimensional shape data of the subject, the three-dimensional shape data of the background is generated based on the images captured by the image capturing units 1. In this process, the captured images used to generate the three-dimensional shape data of the background may be images captured at the time or place different from those of the subject. For example, three-dimensional shape data of a background imitating a virtual space may be generated by expressing a virtual object not existing in the image capturing space where the subject is present, using computer graphics. The three-dimensional shape data of the background also includes material information about each mesh, such as the reflectance and the surface shape of the mesh. The material information about the mesh is not limited to the above-described information, and may include information about at least one of the reflectance and the surface shape, or may further include information other than the reflectance and the surface shape. The information about the reflectance and the surface shape may also be information representing the reflectance and the surface shape of an object corresponding to a background in a real space, or may be information set beforehand by the user. For example, in a case where the background is a virtual object generated using computer graphics, the reflectance and the surface shape are set by the user.

In the present exemplary embodiment, the virtual viewpoint image imitating the state where the subject is reflected and appears in the background is generated. In this generation, it may be desirable to identify a surface (hereinafter referred to as the reflection surface) that reflects the subject. The reflection surface according to the present exemplary embodiment is an area on which a reflection image of the subject is to be superimposed, and may not be a surface that actually reflects the subject. In other words, using the technique described in the present exemplary embodiment makes it possible to express the state where the subject is reflected, even on a floor surface not actually reflecting the subject, or on a virtual floor surface generated using computer graphics. For example, the reflection surface is a glossy surface such as a metal surface or glass. Alternatively, the reflection surface may be a virtual surface formed by virtually expressing such a glossy surface as texture in a background. Typically, the reflection surface is a surface on which specular reflection occurs, or a virtual surface expressed by texture to cause specular reflection.

The three-dimensional shape data of the background according to the present exemplary embodiment includes the coordinates of the reflection surface in the three-dimensional space set beforehand by the user, as information about three-dimensional coordinates. Thus, the reflection surface can be identified by referring to the three-dimensional shape data of the background. An area where reflection occurs may be identified as the reflection surface, based on, for example, the information about the reflectance. In the following description, the information about the three-dimensional coordinates for identifying the reflection surface and the information, such as the reflectance of the reflection surface, will be referred to as the reflection surface information. The form of the three-dimensional shape data of the background is not limited to the form described above. Further, the reflectance on the reflection surface may not be uniform, and the reflectance may vary depending on the position on the reflection surface.

The accumulation unit 4 also accumulates background texture data for coloring the three-dimensional shape data of the background. Specifically, the background texture data is an image to be applied to each polygon mesh. The accumulation unit 4 also accumulates camera parameters, such as the installation positions, orientations, and optical characteristics of the plurality of image capturing units 1.

The accumulation unit 4 may not be configured to store all of the plurality of captured images. For example, the accumulation unit 4 may be configured to store an image obtained by extracting an area desirable for coloring the three-dimensional shape data from each of the captured images. The accumulation unit 4 transmits the accumulated data to the generation apparatus 10 in response to an instruction from the generation apparatus 10.

A functional configuration of the generation apparatus 10 will now be described with reference to FIG. 2, FIGS. 3A to 3D, and FIGS. 4A to 4C. The generation apparatus 10 includes a virtual viewpoint input unit 5, a reflection viewpoint generation unit 6, a first image generation unit 7a, a second image generation unit 7b, a superimposition unit 8, and a display unit 9.

The virtual viewpoint input unit 5 receives an input for determining a virtual viewpoint. The virtual viewpoint input unit 5 receives, for example, information input by the user operating the operation unit 504, and inputs virtual viewpoint information determined based on the received input information, into the first image generation unit 7a and the reflection viewpoint generation unit 6. Here, the virtual viewpoint information is information including parameters indicating the position of the virtual viewpoint and the line-of-sight direction from the virtual viewpoint. The virtual viewpoint information further includes a parameter for identifying the time in a virtual viewpoint image to be generated. The virtual viewpoint information may further include a parameter indicating the angle of view (the visual field) of the virtual viewpoint. The virtual viewpoint information is information including at least the parameters indicating the position of the virtual viewpoint and the line-of-sight direction from the virtual viewpoint. The virtual viewpoint input unit 5 may be, for example, configured to acquire the virtual viewpoint information stored in, for example, the auxiliary storage device 506 and an externally connected storage device.

The first image generation unit 7a generates the virtual viewpoint image, based on the virtual viewpoint information acquired from the virtual viewpoint input unit 5. The first image generation unit 7a acquires data for generating the virtual viewpoint image from the accumulation unit 4, based on the virtual viewpoint information. The first image generation unit 7a renders the background in the virtual viewpoint image, using the three-dimensional shape data of the background and the background texture data, among the acquired data. The first image generation unit 7a also renders the subject in the virtual viewpoint image, using the three-dimensional shape data of the subject and the captured images, among the acquired data. In this process, the subject viewed from the virtual viewpoint is rendered by coloring the three-dimensional shape data of the subject based on the captured images. As a result, the first image generation unit 7a generates a virtual viewpoint image illustrated in FIG. 3A and outputs the generated virtual viewpoint image.

The reflection viewpoint generation unit 6 acquires the three-dimensional shape data of the background from the accumulation unit 4, and identifies the reflection surface based on the information included in the acquired three-dimensional shape data. The reflection surface is, for example, a reflection surface 200 illustrated in FIG. 3A. In the present exemplary embodiment, the reflection surface is identified based on the information indicating the three-dimensional coordinates of the reflection surface included in the three-dimensional shape data. The reflection viewpoint generation unit 6 generates a reflection viewpoint, based on the virtual viewpoint information acquired from the virtual viewpoint input unit 5 and the identified reflection surface. The reflection viewpoint is a virtual viewpoint having a predetermined positional relationship with the reflection surface and the designated virtual viewpoint, and is acquired by converting the position of the designated virtual viewpoint based on the position of the reflection surface. The reflection viewpoint generation unit 6 inputs the virtual viewpoint information (hereinafter referred to as reflection viewpoint information) representing the reflection viewpoint into the second image generation unit 7b.

Figure 3A:
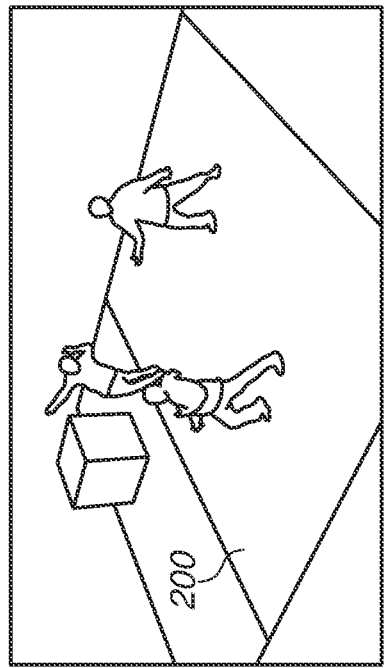
FIGS. 3A to 3D are diagrams each illustrating an example of a virtual viewpoint image generated by the generation apparatus.
Figure 3B:
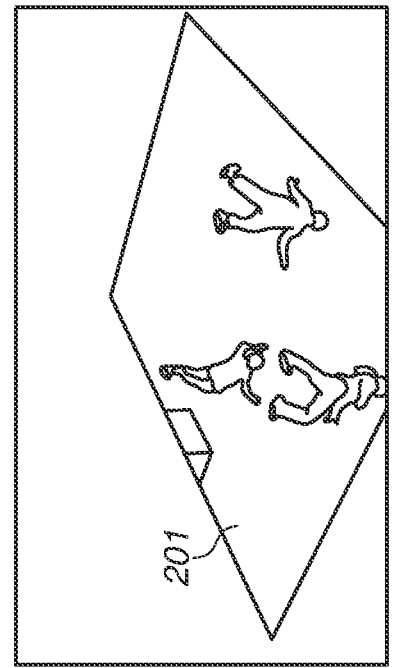

The second image generation unit 7b generates a virtual viewpoint image (hereinafter referred to as a reflection viewpoint image) corresponding to the reflection viewpoint, based on the reflection viewpoint information and the data acquired from the accumulation unit 4. For example, the reflection viewpoint image corresponding to the virtual viewpoint image illustrated in FIG. 3A is an image illustrated in FIG. 3B. A method of generating the reflection viewpoint and the reflection viewpoint image will be described in detail below.

Figure 3C:
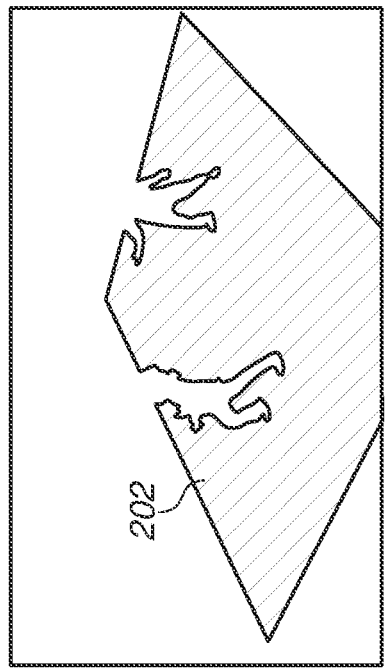
Figure 3D:
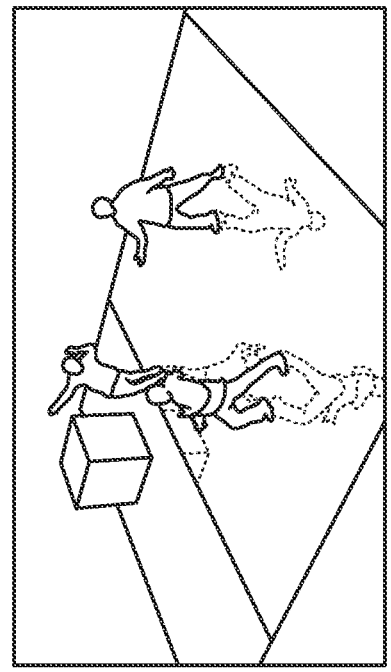

The superimposition unit 8 superimposes the reflection viewpoint image on the virtual viewpoint image, based on the virtual viewpoint image generated by the first image generation unit 7a, the reflection viewpoint image generated by the second image generation unit 7b, and the reflection surface information. As a result, the superimposition unit 8 generates a virtual viewpoint image imitating the reflection of the subject as illustrated in FIG. 3D. The display unit 9 displays the virtual viewpoint image generated by the superimposition unit 8.

Figure 5:
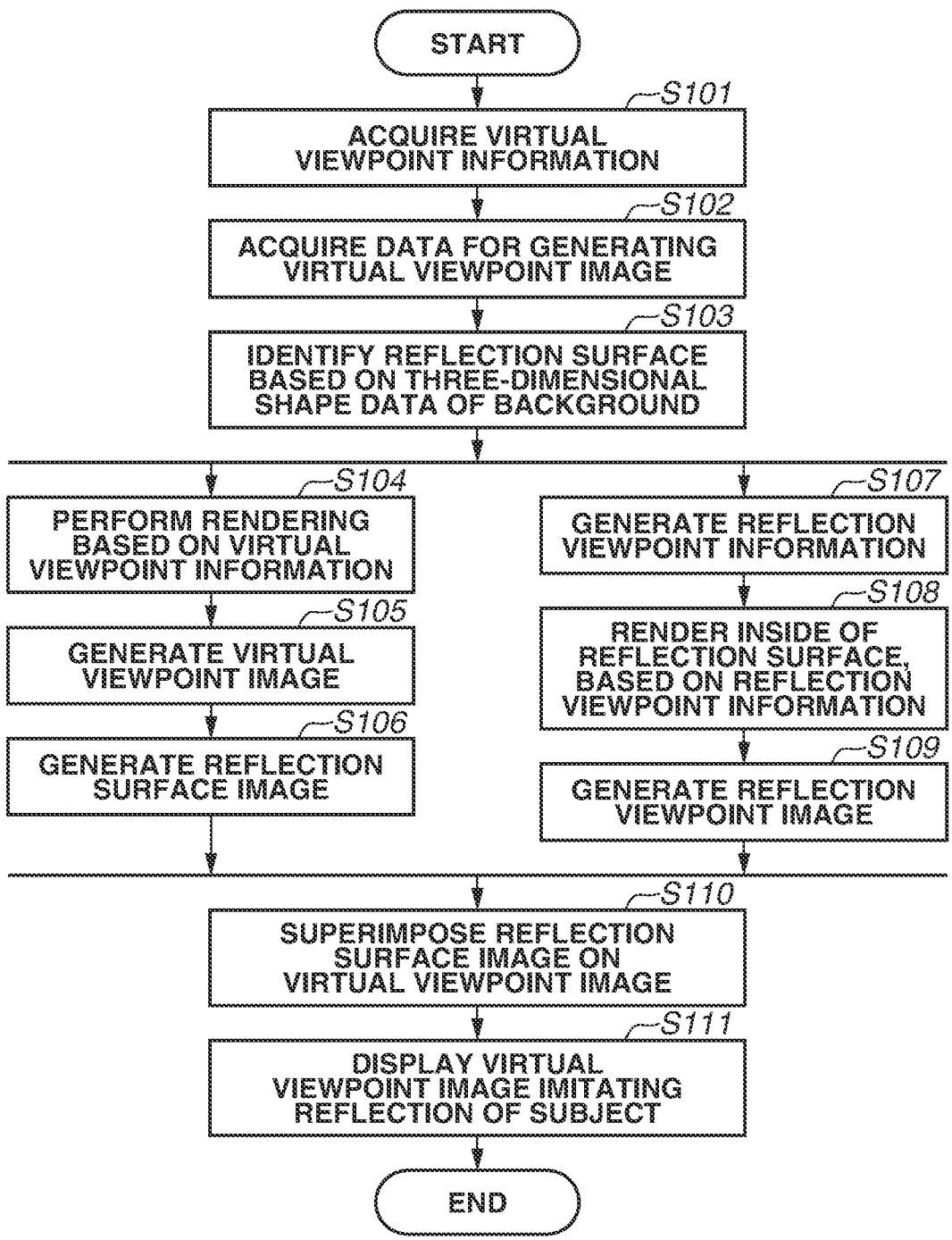
FIG. 5 is a flowchart illustrating processing performed by the generation apparatus.

Processing performed by the generation apparatus 10 will now be described with reference to FIG. 3A to FIG. 5. FIG. 5 is a flowchart illustrating processing performed by the generation apparatus 10. The CPU 501 included in the generation apparatus 10 reads out a program stored in the ROM 503 or the auxiliary storage device 506, and executes the read-out program, so that the processing illustrated in FIG. 5 is executed. The processing illustrated in FIG. 5 starts when the user performs an operation for designating the virtual viewpoint.

In step S101, the virtual viewpoint input unit 5 receives an input operation for designating the position of the virtual viewpoint and the line-of-sight direction from the virtual viewpoint, performed in the operation unit 504. The virtual viewpoint input unit 5 transmits the virtual viewpoint information determined based on the received input operation to the first image generation unit 7a and the reflection viewpoint generation unit 6. Here, a virtual viewpoint 300 in FIG. 4A is determined as the virtual viewpoint.

In step S102, the first image generation unit 7a acquires, from the accumulation unit 4, the captured images, the three-dimensional shape data of the subject, and the three-dimensional shape data of the background, as the data for generating the virtual viewpoint image, based on the acquired virtual viewpoint information. In step S103, the first image generation unit 7a and the reflection viewpoint generation unit 6 acquire the three-dimensional shape data of the background from the accumulation unit 4, and identify the reflection surface based on the information included in the acquired three-dimensional shape data. Here, the reflection surface 200 in FIG. 3A is identified.

There will be described processing performed in steps S104 to S106 performed by the first image generation unit 7a, and processing performed in steps S107 to S109 performed by the reflection viewpoint generation unit 6 and the second image generation unit 7b. The processing performed in steps S104 to S106 and the processing performed in steps S107 to S109 can be performed in parallel.

In step S104, the first image generation unit 7a performs coloring (rendering) of the three-dimensional shape data of the subject and the three-dimensional shape data of the background, based on the captured images and the virtual viewpoint information. In step S105, the first image generation unit 7a generates the virtual viewpoint image in which the subject and the background are rendered. Here, the image illustrated in FIG. 3A is generated as the virtual viewpoint image corresponding to the virtual viewpoint 300 illustrated in FIG. 4A. The first image generation unit 7a transmits the generated virtual viewpoint image to the superimposition unit 8.

In step S106, the first image generation unit 7a generates an image (hereinafter referred to as a reflection surface image) formed by extracting an area corresponding to the reflection surface from the generated virtual viewpoint image. The reflection surface image is, for example, an image excluding the area of the subject from the area of the reflection surface, as illustrated in FIG. 3C. The reflection surface image is generated by, for example, the following method. The first image generation unit 7a performs rendering using the reflection surface information acquired in step S103 so that the reflection surface has a predetermined pixel value (e.g., 1) in the inside thereof. The first image generation unit 7a also performs rendering such that the subject and the background excluding the reflection surface have a pixel value (e.g., 0) different from that of the reflection surface. The reflection surface image in which the area of the reflection surface excluding the subject is rendered with a predetermined color is generated as illustrated in FIG. 3C, accordingly. The first image generation unit 7a transmits the generated reflection surface image to the superimposition unit 8.

In step S107, the reflection viewpoint generation unit 6 generates the reflection viewpoint information, based on the virtual viewpoint information acquired from the virtual viewpoint input unit 5. Here, a reflection viewpoint 301 obtained by inverting the virtual viewpoint 300 illustrated in FIG. 4A with respect to the reflection surface 200 is generated. In other words, the reflection viewpoint 301 is a virtual viewpoint obtained by inverting each of the position of the virtual viewpoint 300 and the line-of-sight direction from the virtual viewpoint 300 with respect to the reflection surface 200.

The processing in which the reflection viewpoint generation unit 6 generates the reflection viewpoint information will be described with reference to FIGS. 8A and 8B.

Figure 8A:
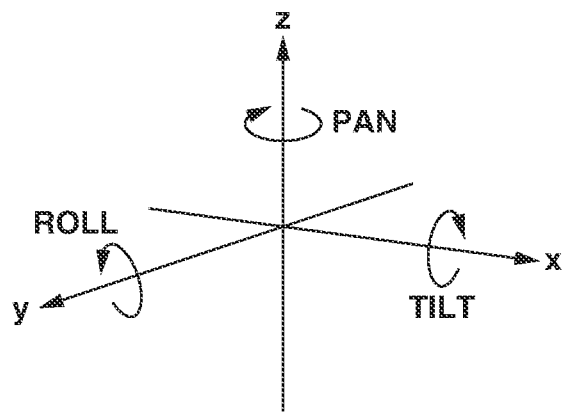
FIGS. 8A and 8B are diagrams illustrating an example of a reflection viewpoint.

FIG. 8A is a diagram illustrating an orientation of a virtual camera. Here, for convenience, the virtual camera will be described as the virtual viewpoint. The position and the line-of-sight direction of the virtual viewpoint correspond to the position and the orientation of the virtual camera, respectively. The orientation of the virtual camera is represented by a rotation angle (pan) of the virtual camera in the horizontal direction, a rotation angle (tilt) of the virtual camera in the vertical direction, and a rotation angle (roll) of the virtual camera in the optical axis direction.

Figure 8B:
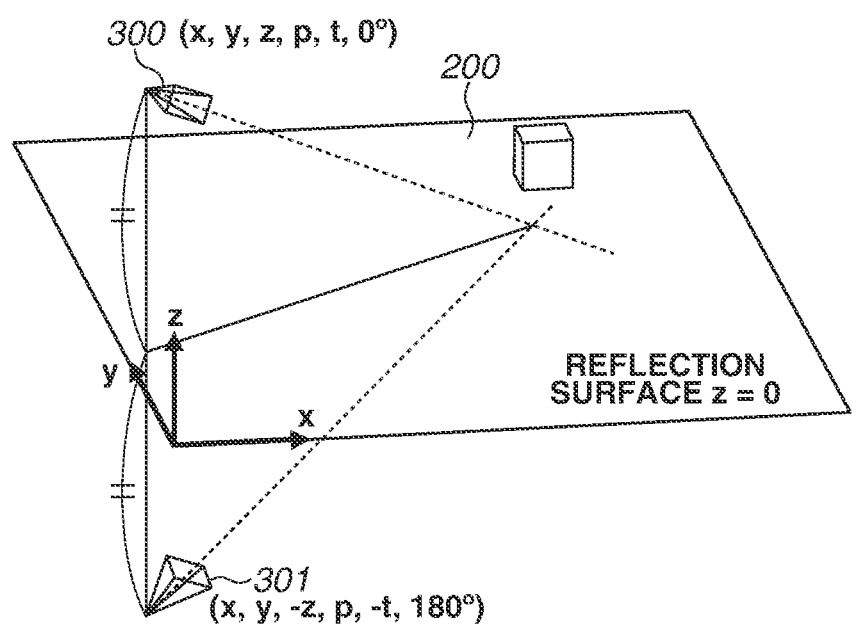

FIG. 8B is a diagram illustrating an example of each of the virtual viewpoint and the reflection viewpoint. In the example in FIG. 8B, (x, y, z, p, t, 0°) are set as parameters representing the position of the virtual viewpoint 300 and the line-of-sight direction from the virtual viewpoint 300. Here, x, y, and z are a value indicating an x-coordinate, a value indicating a y-coordinate, and a value indicating a z-coordinate, respectively, of the virtual viewpoint 300 in a three-dimensional space expressed by an xyz coordinate system. Further, p, t, and 0° are a value indicating the pan angle, a value indicating the tilt angle, and a value indicating the roll angle, respectively, of the virtual viewpoint 300, described with reference to FIG. 8A. The pan, tilt, and roll angles are each expressed as a rotation angle from a reference direction (e.g., an x-axis, a y-axis, and a z-axis). Here, the coordinate representing the reflection surface 200 has a coordinate z=0. The reflection viewpoint generation unit 6 determines the position of the reflection viewpoint 301 to be a position symmetrical to the virtual viewpoint 300 with respect to the reflection surface 200 (z=0). As a result, the value of the x-coordinate, the value of the y-coordinate, and the value of the z-coordinate of the reflection viewpoint 301 are x, y, and −z, respectively. The reflection viewpoint generation unit 6 determines the line-of-sight direction from the reflection viewpoint 301, based on the reflection surface 200 (z=0). In this process, the reflection viewpoint generation unit 6 changes the line-of-sight direction in order of pan, tilt, and roll. The value of the pan of the reflection viewpoint 301 becomes identical to the value of the pan of the virtual viewpoint 300. The value of the tilt of the reflection viewpoint 301 becomes a value obtained by inverting the value of the tilt of the virtual viewpoint 300. The value of the roll of the reflection viewpoint 301 is converted from 0° to 180°. The parameters representing the reflection viewpoint 301 are (x, y, −z, p, −t, 180°), accordingly. In this way, the position of the reflection viewpoint 301 is the position symmetrical to the position of the virtual viewpoint 300 with respect to the reflection surface 200. The line-of-sight direction from the reflection viewpoint 301 is a line-of-sight direction crossing the reflection surface 200, at the intersection of the reflection surface 200 and the line-of-sight direction from the virtual viewpoint 300. In other words, the line-of-sight direction from the reflection viewpoint 301 and the line-of-sight direction from the virtual viewpoint 300 cross each other at the same position on the reflection surface 200. The position of the reflection viewpoint 301 may be set based on the position symmetrical to the position of the virtual viewpoint 300 with respect to the reflection surface 200, or may differ from the position symmetrical to the position of the virtual viewpoint 300 with respect to the reflection surface 200. The intersection of the line-of-sight direction from the reflection viewpoint 301 and the reflection surface 200 may differ from the intersection of the reflection surface 200 and the line-of-sight direction from the virtual viewpoint 300. In other words, the parameters (x, y, −z, p, −t, 180°) representing the reflection viewpoint 301 may differ to some extent.

The parameters (the reflection viewpoint information) representing the reflection viewpoint are generated by the above-described method.

The example in FIG. 8B illustrates the case where the reflection surface has a coordinate z=0, but each parameter can be converted based on the three-dimensional position of the reflection surface, even if the reflection surface is a reflection surface other than the reflection surface of z=0. Furthermore, the reflection surface is not limited to be a 'floor' perpendicular to the z axis. For example, a reflective 'wall' parallel to the z axis may be defined as the reflective surface. In the above-described method, the calculation for the conversion can be complicated in a case where the value of the roll is not 0. Thus, in a case where the rotation in the roll direction is performed, the superimposition unit 8 may be controlled to rotate the generated virtual viewpoint image in a subsequent stage. The reflection viewpoint generation unit 6 transmits the generated reflection viewpoint information to the second image generation unit 7b.

In step S108, the second image generation unit 7b generates the reflection viewpoint image, based on the reflection surface information and the reflection viewpoint information. Here, a method of generating the reflection viewpoint image illustrated in FIG. 3B will be described. The second image generation unit 7b performs rendering using the color of the subject viewed from the reflection viewpoint, based on the shape data of the subject and the reflection viewpoint information. In this process, the second image generation unit 7b renders only the inside of an area corresponding to the reflection surface, using the reflection surface information. Only the subject to be reflected on the reflection surface may be rendered as the reflection viewpoint image, and therefore, unnecessary rendering processing can be reduced by rendering only the inside of the reflection surface. In this process, the second image generation unit 7b does not render the reflection surface. The second image generation unit 7b according to the present exemplary embodiment is configured to render only the subject to be reflected on the reflection surface, but may be configured to also render the background to be reflected on the reflection surface.

The positional relationship of the subject when viewed from the reflection viewpoint 301 is mirror-reversed as illustrated in FIG. 4C. Thus, in step S109, the second image generation unit 7b inverts the image, which is obtained by rendering the inside of the reflection surface in step S108, left and right. The second image generation unit 7b thereby generates the reflection viewpoint image illustrated in FIG. 3B. The second image generation unit 7b transmits the generated reflection viewpoint image to the superimposition unit 8.

In step S110, the superimposition unit 8 generates the virtual viewpoint image imitating the reflection of the subject as illustrated in FIG. 3D, based on the virtual viewpoint image, the reflection surface image, and the reflection viewpoint image. The virtual viewpoint image generated by the superimposition unit 8 is a virtual viewpoint image corresponding to the virtual viewpoint represented by the virtual viewpoint information acquired by the virtual viewpoint input unit 5. The virtual viewpoint image illustrated in FIG. 3D is generated as follows. The superimposition unit 8 extracts an area corresponding to a reflection surface 202 represented by the reflection surface image (FIG. 3C), from the reflection viewpoint image (FIG. 3B) acquired from the second image generation unit 7b. The superimposition unit 8 also generates the virtual viewpoint image illustrated in FIG. 3D by superimposing the extracted area on the virtual viewpoint image (FIG. 3A). This virtual viewpoint image includes an image indicating a state where the object located in the image capturing space is reflected on the reflection surface. Among objects located in the image capturing space, even an object not included in the virtual viewpoint image generated by the first image generation unit 7a can be included in the virtual viewpoint image generated by the second image generation unit 7b. In that case, the virtual viewpoint image generated by the superimposition unit 8 can include an image indicating a state where such an object is reflected on the reflection surface. A more realistic image can thereby be obtained.

The superimposition unit 8 can reproduce more realistic reflection by subjecting the reflection viewpoint image to predetermined image processing, when superimposing the reflection viewpoint image on the virtual viewpoint image. For example, the superimposition unit 8 superimposes the reflection viewpoint image on the virtual viewpoint image, after performing processing for changing at least one of the transmittance and the blending rate of the reflection viewpoint image, based on the reflectance included in the reflection surface information. The transmittance of the reflection viewpoint image is a parameter for determining the ratio of the pixel value of the reflection viewpoint image when superimposing the reflection viewpoint image on the virtual viewpoint image. The ratio of the pixel value is lower as the transmittance is higher. The blending rate is a parameter for determining the ratio of the pixel value of each image when combining the virtual viewpoint image and the reflection viewpoint image. As the blending rate of the reflection viewpoint image is higher, the ratio of the pixel value of the reflection viewpoint image is higher, and the ratio of the pixel value of the virtual viewpoint image is lower.

For example, the superimposition unit 8 performs at least one of processing for reducing the transmittance of the reflection viewpoint image and processing for increasing the blending rate, as the reflectance included in the reflection surface information is higher, based on the reflection viewpoint image before being subjected to the image processing.

Further, for example, the superimposition unit 8 superimposes the reflection viewpoint image on the virtual viewpoint image, after performing processing for adding gradation or transformation to the reflection viewpoint image, based on the information representing the surface shape of the background such as irregularities, included in the three-dimensional shape data of the background.

Furthermore, for example, on the reflection surface 200 rendered in the virtual viewpoint image, the superimposition ratio of the reflection viewpoint image is set low for a high luminance portion, and the superimposition ratio of the reflection viewpoint image is set high for a low luminance portion. This processing makes it possible to imitate a state where the subject is reflected relatively dark on the reflection surface of a dark color, the subject is reflected relatively light on the reflection surface of a light color, or the subject is not reflected. In this processing, for example, the superimposition unit 8 refers to a predetermined threshold about the luminance, and changes the pixel value of the reflection viewpoint image, depending on whether the luminance of the reflection surface in the virtual viewpoint image is higher than the predetermined threshold or not. For example, the superimposition unit 8 may further refer to a table in which the luminance of the reflection surface and the ratio of the pixel value of the reflection viewpoint image are associated with each other, and change the pixel value of the reflection viewpoint image depending on the luminance of the reflection surface.

The above-described various kinds of image processing for the reflection viewpoint image may be performed by the second image generation unit 7b.

In step S111, the superimposition unit 8 displays the generated virtual viewpoint image on the display unit 9. The virtual viewpoint image imitating the reflection of the subject is generated by the processing performed in steps S101 to S111 described above. In a case where the virtual viewpoint image is a moving image, the processing in steps S101 to S110 is repeated for each frame of the moving image. For example, in a case where the frame rate of the moving image is 60 fps (frame per second), the processing in steps S101 to S111 is repeated every $\frac{1}{60}$ second.

If the reflection viewpoint image is generated in a case where the virtual viewpoint represented by the virtual viewpoint information acquired from the virtual viewpoint input unit 5 is located on the backside of the reflection surface (e.g., below the reflecting floor surface), the following issue arises. That is, the virtual viewpoint image generated in the superimposition unit 8 is an unnatural virtual viewpoint image in which the subject is reflected on the backside of the floor surface although the backside is not captured by the image capturing unit 1. Thus, the reflection viewpoint generation unit 6 does not output the reflection viewpoint information, in a case where the virtual viewpoint is located in a specific space. The specific space is, for example, a space in contact with the backside of the reflection surface, in the three-dimensional space rendered in the virtual viewpoint image. The front and the back of the reflection surface are identified based on the normal information of the polygon mesh included in the three-dimensional shape data of the background. In other words, the direction opposite to the normal corresponds to the backside of the mesh. In generating the virtual viewpoint image according to the present exemplary embodiment, the three-dimensional shape data of the background is generated such that the front side of the reflection surface is in contact with the space where the subject is present. Therefore, the specific space can be a space where the subject is not present with respect to the reflection surface.

In a case where the virtual viewpoint is located in the specific space (the space where the subject is not present with respect to the reflection surface), the reflection viewpoint generation unit 6 does not output the reflection viewpoint information. The first image generation unit 7a renders the subject and the background without the reflection surface. This makes it possible to prevent the second image generation unit 7b from generating the reflection viewpoint image, so that superimposition of an unnatural reflection viewpoint image in the superimposition unit 8 can be prevented.

The reflection of the subject can be expressed in the virtual viewpoint image by the above-described method. It is conceivable to use, for example, a ray tracing method for generating the image imitating the reflection of the subject. In this method, however, it is desirable to calculate a beam path pixel by pixel, and thus it may be difficult to perform high-speed processing with a heavy processing load. In contrast, the above-described method reduces the processing load on hardware by using a simple method of combining two virtual viewpoint images, so that high-speed processing can be performed.

(Modifications of First Exemplary Embodiment)

The second image generation unit 7b of the first exemplary embodiment described above renders only the inside of the reflection surface in step S108 in FIG. 5. However, the first exemplary embodiment is not necessarily limited to this method. For example, the second image generation unit 7b may render the entire subject viewed from the reflection viewpoint as illustrated in FIG. 4B, as the reflection viewpoint image. The superimposition unit 8 may subsequently extract an area corresponding to the reflection surface 200 from the reflection viewpoint image based on the reflection surface information, and superimpose the extracted area on the virtual viewpoint image. In this case as well, the virtual viewpoint image similar to that in the first exemplary embodiment is obtained. However, the throughput of the second image generation unit 7b can be reduced by rendering only the inside of the reflection surface when generating the reflection viewpoint image.

Further, in the first exemplary embodiment described above, the reflection surface 200 included in the three-dimensional shape data of the background is described to be one, but a plurality of reflection surfaces may be provided. For example, in a case where there are two reflection surfaces, e.g., a floor surface and a wall surface, in the three-dimensional shape data of the background, the reflection viewpoint generation unit 6 sequentially generates a reflection viewpoint corresponding to the floor surface and a reflection viewpoint corresponding to the wall surface. The second image generation unit 7b sequentially generates reflection viewpoint images corresponding to the two reflection viewpoints generated in the reflection viewpoint generation unit 6. The superimposition unit 8 superimposes the two generated reflection viewpoint images on the virtual viewpoint image. The virtual viewpoint image imitating the reflection of the subject in a case where a plurality of reflection surfaces is present can thereby be generated. In a case where there are three or more reflection surfaces, the generation is similarly performed. In this case, a plurality of second image generation units 7b may be provided and configured to generate the reflection viewpoint images in parallel.

In the first exemplary embodiment described above, the case where the reflection surface is a flat surface is described. However, the reflection surface may be a curved surface. In a case where the reflection surface is a curved surface, the reflection viewpoint generation unit 6 and the second image generation unit 7b can generate the reflection viewpoint and the reflection viewpoint image, respectively, in a method similar to the above-described method, after approximating the curved surface to a plurality of flat surfaces.

In the first exemplary embodiment described above, the superimposition unit 8 is described to have the configuration of outputting the generated virtual viewpoint image to the display unit 9 to display the virtual viewpoint image. However, the first exemplary embodiment is not necessarily limited to this configuration. For example, the superimposition unit 8 may be configured to output the generated virtual viewpoint image as an image data file.

Figure 6:
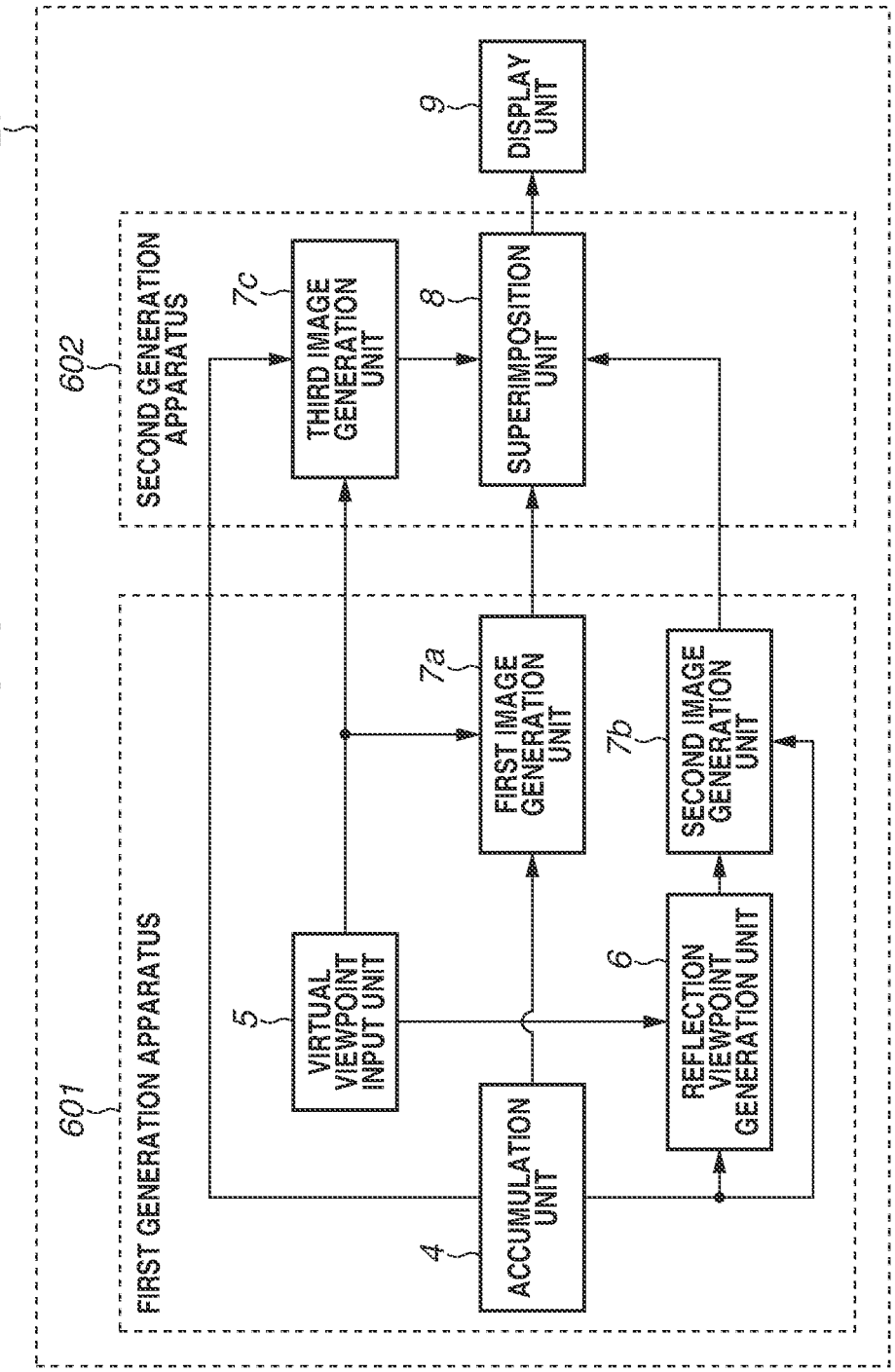
FIG. 6 is a block diagram illustrating a configuration of a generation system according to a second exemplary embodiment.

A configuration of a generation system 21 that generates a virtual viewpoint image in a second exemplary embodiment will be described with reference to FIG. 6. The generation system 21 includes a first generation apparatus 601 and a second generation apparatus 602. The first generation apparatus 601 includes an accumulation unit 4, a virtual viewpoint input unit 5, a reflection viewpoint generation unit 6, a first image generation unit 7a, and a second image generation unit 7b. The accumulation unit 4 may be a device externally connected to the first generation apparatus 601. The second generation apparatus 602 includes a third image generation unit 7c and a superimposition unit 8. In the present exemplary embodiment, the processing unit having a name and a reference character identical to those in the first exemplary embodiment has a function identical to that in the first exemplary embodiment.

In the present exemplary embodiment, the first generation apparatus 601 generates a virtual viewpoint image of only a subject, and the second generation apparatus 602 generates a virtual viewpoint image created by rendering a background on the virtual viewpoint image generated by the first generation apparatus 601. Processing to be performed by the generation system 21 will be described with reference to FIG. 7.

Processing in steps S701 to S708 is performed in the first generation apparatus 601. In step S701, the virtual viewpoint input unit 5 receives an input operation for designating the position of a virtual viewpoint and a line-of-sight direction from the virtual viewpoint. The input operation is performed in an operation unit 504. The virtual viewpoint input unit 5 also transmits virtual viewpoint information determined based on the received input operation to the reflection viewpoint generation unit 6, the first image generation unit 7a, and the third image generation unit 7c.

In step S702, the first image generation unit 7a acquires captured images and three-dimensional shape data of a subject from the accumulation unit 4, as data for generating a virtual viewpoint image, based on the acquired virtual viewpoint information. In step S703, the first image generation unit 7a acquires reflection surface information from the accumulation unit 4. In the present exemplary embodiment, the background is rendered mainly by the second generation apparatus 602, and therefore, the information acquired here may be only information that can identify the position of a reflection surface. The accumulation unit 4 may be included in a different apparatus instead of being included in the first generation apparatus 601.

In step S704, the first image generation unit 7a renders the subject, based on the virtual viewpoint information and the data acquired from the accumulation unit 4. In step S705, the first image generation unit 7a generates the virtual viewpoint image of only the subject, accordingly. The first image generation unit 7a transmits the generated virtual viewpoint image of only the subject to the superimposition unit 8.

In step S706, the reflection viewpoint generation unit 6 generates reflection viewpoint information, based on the reflection surface information and the virtual viewpoint information. The method of generating the reflection viewpoint information is similar to that described in the first exemplary embodiment. In step S707, the second image generation unit 7b renders the subject within the reflection surface, based on the reflection surface information and the reflection viewpoint information. In step S708, the second image generation unit 7b generates a reflection viewpoint image, accordingly. The method of generating the reflection viewpoint image is also similar to that described in the first exemplary embodiment. The second image generation unit 7b transmits the generated reflection viewpoint image to the superimposition unit 8. This ends the processing performed in the first generation apparatus 601.

Processing in steps S709 to S711 is performed in the second generation apparatus 602. In step S709, the third image generation unit 7c generates the virtual viewpoint image of only the background, by acquiring the three-dimensional shape data of the background from the accumulation unit 4 and rendering the background, based on the virtual viewpoint information. The superimposition unit 8 superimposes the reflection viewpoint image acquired from the second image generation unit 7b, on the generated virtual viewpoint image of only the background. The superimposition unit 8 superimposes the reflection viewpoint image, after performing image processing, such as adding gradation and transformation to the reflection viewpoint image, and changing the ratio of the pixel value for superimposition, as with the first exemplary embodiment.

In step S710, the superimposition unit 8 superimposes the virtual viewpoint image of only the subject generated in step S705, on the virtual viewpoint image generated in step S709. In this process, the superimposition unit 8 compares the distance information of the subject and the distance information of the background pixel by pixel, and performs rendering using the color corresponding to the distance closer to the position of the virtual viewpoint. In other words, the superimposition unit 8 performs rendering using the pixel value of the virtual viewpoint image of only the subject, in a case where the distance between the virtual viewpoint and the subject is shorter than the distance between the virtual viewpoint and the background. The superimposition unit 8 performs rendering using the pixel value of the virtual viewpoint image of only the background, in a case where the distance between the virtual viewpoint and the subject is longer than the distance between the virtual viewpoint and the background. The superimposition unit 8 consequently generates the virtual viewpoint image imitating the reflection of the subject as illustrated in FIG. 3D. In step S711, the superimposition unit 8 displays the generated virtual viewpoint image on the display unit 9.

The configuration described in the present exemplary embodiment makes it possible to perform the generation of the virtual viewpoint image of the subject and the reflection viewpoint image, and the generation of the virtual viewpoint image of the background and other image editing processing, separately, in the different apparatuses. This configuration produces such an effect that, after a subject is captured and a video image of the subject is generated, processing for elaborating a background and editing the video image with a sufficient time can be performed.

In the present exemplary embodiment, the second generation apparatus 602 acquires the three-dimensional shape data of the background from the accumulation unit 4, but is not limited to this configuration. The second generation apparatus 602 can be configured to acquire the three-dimensional shape data from an externally or internally connected storage device different from the accumulation unit 4. In this configuration, the accumulation unit 4 does not need to store all the three-dimensional shape data of the background, and may store only the three-dimensional shape data of the subject and the reflection surface information.

According to the present disclosure, the virtual viewpoint image that can express the reflection of the subject can be generated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-175734, filed Oct. 20, 2020, which is hereby incorporated by reference herein in its entirety.

What is claimed is:

1. A generation apparatus comprising:
one or more memories storing instructions; and
one or more processors executing the instructions to:
acquire a first virtual viewpoint image generated based on a plurality of images captured by a plurality of image capturing apparatuses and a first virtual viewpoint in a three-dimensional space;
acquire a second virtual viewpoint image generated based on the plurality of captured images and a second virtual viewpoint arranged with respect to a predetermined surface in the three-dimensional space with the first virtual viewpoint,
wherein a position of the second virtual viewpoint and a line-of-sight direction from the second virtual viewpoint are symmetrical to a position of the first virtual viewpoint and a line-of-sight direction from the first virtual viewpoint with respect to the predetermined surface; and
generate a third virtual viewpoint image corresponding to the first virtual viewpoint and including an image indicating a state where an object in the image capturing space is reflected on the predetermined surface, based on the first virtual viewpoint image and the second virtual viewpoint image.

2. The generation apparatus according to claim 1, wherein the third virtual viewpoint image includes an image indicating a state where an object in the image capturing space is reflected on the predetermined surface.

3. The generation apparatus according to claim 1, wherein the third virtual viewpoint image is generated based on combination of the first virtual viewpoint image and the second virtual viewpoint image.

4. The generation apparatus according to claim 3, wherein the first virtual viewpoint image and the second virtual viewpoint image are combined in an area corresponding to the predetermined surface in the third virtual viewpoint image.

5. The generation apparatus according to claim 3, wherein the first virtual viewpoint image and the second virtual viewpoint image are combined based on a combining ratio determined based on at least one of a reflectance of the predetermined surface, and a luminance identified by a pixel value of an area corresponding to the predetermined surface in the first virtual viewpoint image.

6. The generation apparatus according to claim 1, wherein the second virtual viewpoint image is not generated in a case where the first virtual viewpoint is in a specific space, and the second virtual viewpoint image is generated in a case where the first virtual viewpoint is not in the specific space.

7. The generation apparatus according to claim 6, wherein the specific space is a space different from the image capturing space captured by the plurality of image capturing apparatus.

8. The generation apparatus according to claim 1, wherein the first virtual viewpoint image is generated based on three-dimensional shape data representing a three-dimensional shape of a first object in the image capturing space, and three-dimensional shape data representing a three-dimensional shape of a second object having the predetermined surface.

9. The generation apparatus according to claim 8, wherein the second virtual viewpoint image is generated based on the three-dimensional shape data representing the three-dimensional shape of the first object, but not based on the three-dimensional shape data representing the three-dimensional shape of the second object.

10. The generation apparatus according to claim 1, wherein the third virtual viewpoint image is generated based on the first virtual viewpoint image, and the second virtual viewpoint image subjected to predetermined processing based on surface information about the predetermined surface.

11. The generation apparatus according to claim 10,
wherein the surface information includes information representing a reflectance of the predetermined surface, and
wherein the predetermined processing changes a pixel value of the second virtual viewpoint image, based on the reflectance included in the surface information.

12. The generation apparatus according to claim 11, wherein the predetermined processing further changes a pixel value of the first virtual viewpoint image, based on the reflectance included in the surface information.

13. The generation apparatus according to claim 11, wherein the predetermined processing changes the pixel value of the second virtual viewpoint image based on a first ratio in a case where the reflectance is a first value, and changes the pixel value of the second virtual viewpoint image based on a second ratio greater than the first ratio in a case where the reflectance is a second value greater than the first value.

14. The generation apparatus according to claim 10,
wherein the surface information includes information representing a shape of the predetermined surface, and
wherein the predetermined processing transforms the second virtual viewpoint image, based on the information representing the shape of the predetermined surface.

15. The generation apparatus according to claim 10, wherein the predetermined processing changes a pixel value of the second virtual viewpoint image, based on a luminance identified by a pixel value of an area corresponding to the predetermined surface in the first virtual viewpoint image.

16. The generation apparatus according to claim 1, wherein a pixel value of an area corresponding to the predetermined surface of the third virtual viewpoint image is determined based on a pixel value of an area corresponding to the predetermined surface of the second virtual viewpoint image, and surface information about the predetermined surface.

17. The generation apparatus according to claim 1,
wherein the one or more processors execute the instructions further to, in a case where the predetermined surface is each of a plurality of predetermined surfaces, acquire a plurality of second virtual viewpoint images each corresponding to a different one of the plurality of predetermined surfaces, and
wherein the third virtual viewpoint image corresponding to the first virtual viewpoint is generated, based on the first virtual viewpoint image and the plurality of second virtual viewpoint images.

18. A generation method comprising:
acquiring a first virtual viewpoint image generated based on a plurality of images captured by a plurality of image capturing apparatuses and a first virtual viewpoint in a three-dimensional space;
acquiring a second virtual viewpoint image generated based on the plurality of captured images and a second virtual viewpoint arranged with respect to a predetermined surface in the three-dimensional space with the first virtual viewpoint,
wherein a position of the second virtual viewpoint and a line-of-sight direction from the second virtual viewpoint are symmetrical to a position of the first virtual viewpoint and a line-of-sight direction from the first virtual viewpoint with respect to the predetermined surface; and
generating a third virtual viewpoint image corresponding to the first virtual viewpoint and including an image indicating a state where an object in the image capturing space is reflected on the predetermined surface, based on the first virtual viewpoint image.

19. A non-transitory computer-readable storage medium that stores a computer program for causing a computer to:
acquiring a first virtual viewpoint image generated based on a plurality of images captured by a plurality of image capturing apparatuses and a first virtual viewpoint in a three-dimensional space;
acquiring a second virtual viewpoint image generated based on the plurality of captured images and a second virtual viewpoint arranged with respect to a predetermined surface in the three-dimensional space with the first virtual viewpoint,
wherein a position of the second virtual viewpoint and a line-of-sight direction from the second virtual viewpoint are symmetrical to a position of the first virtual viewpoint and a line-of-sight direction from the first virtual viewpoint with respect to the predetermined surface; and
generating a third virtual viewpoint image corresponding to the first virtual viewpoint and including an image indicating a state where an object in the image capturing space is reflected on the predetermined surface, based on the first virtual viewpoint image.

* * * * *